US007836551B2

(12) United States Patent
Hung et al.

(10) Patent No.: US 7,836,551 B2
(45) Date of Patent: Nov. 23, 2010

(54) HINGE STRUCTURE WITH LOCKING FEATURE

(75) Inventors: Yi-Hsun Hung, Taipei (TW); Pao-Lung Wang, Taipei (TW); Ping-Huang Kuo, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 12/396,754

(22) Filed: Mar. 3, 2009

(65) Prior Publication Data
US 2010/0088854 A1 Apr. 15, 2010

(30) Foreign Application Priority Data
Oct. 15, 2008 (TW) .............................. 97139591 A

(51) Int. Cl.
E05B 69/00 (2006.01)
(52) U.S. Cl. ............................................. 16/319; 70/58
(58) Field of Classification Search ............... 16/319, 16/223, 321; 361/679.57; 70/58
See application file for complete search history.

(56) References Cited

U.S. PATENT DOCUMENTS

| 4,841,100 | A | * | 6/1989 | Ignasiak | 174/138 G |
|---|---|---|---|---|---|
| 5,687,592 | A | * | 11/1997 | Penniman et al. | 70/14 |
| 5,870,281 | A | * | 2/1999 | Kim | 361/679.57 |
| 6,763,688 | B1 | * | 7/2004 | Syu | 70/14 |
| 7,057,885 | B2 | * | 6/2006 | Shih-Tsung | 361/679.57 |
| 7,549,308 | B2 | * | 6/2009 | Avganim | 70/58 |
| 7,562,547 | B2 | * | 7/2009 | Avganim | 70/58 |
| 7,584,524 | B2 | * | 9/2009 | Hung | 16/337 |
| 7,610,684 | B2 | * | 11/2009 | Steinich | 33/1 PT |
| 7,644,890 | B2 | * | 1/2010 | Quincieu | 244/172.6 |
| 2004/0093690 | A1 | * | 5/2004 | Lu et al. | 16/330 |
| 2005/0039502 | A1 | * | 2/2005 | Avganim | 70/58 |
| 2006/0107073 | A1 | * | 5/2006 | Lane et al. | 713/194 |
| 2007/0113379 | A1 | * | 5/2007 | Lu et al. | 16/319 |
| 2007/0277566 | A1 | * | 12/2007 | Yu | 70/58 |
| 2008/0184529 | A1 | * | 8/2008 | Thom | 16/337 |
| 2010/0024166 | A1 | * | 2/2010 | Wang | 16/321 |

\* cited by examiner

*Primary Examiner*—Victor Batson
*Assistant Examiner*—Matthew Sullivan
(74) *Attorney, Agent, or Firm*—Tim Tingkang Xia; Morris, Manning & Martin, LLP

(57) ABSTRACT

A hinge structure with locking feature is connected to a first body of an electronic device through a support frame. A pivot portion of the hinge structure is connected to a second body of the electronic device and includes a rotating shaft connected to the support frame, such that the first body is capable of rotating relative to the second body. Moreover, a lock receptacle is disposed on the support frame, and is engaged with a matching lock unit. Therefore, the electronic device is secured to a fixed position, which thus achieves an anti-theft function.

16 Claims, 4 Drawing Sheets

HINGE STRUCTURE WITH LOCKING FEATURE

CROSS-REFERENCE TO RELATED APPLICATIONS

This non-provisional application claims priority under 35 U.S.C. §119(a) on Patent Application No(s). 097139591 filed in Taiwan, R.O.C. on Oct. 15, 2008 the entire contents of which are hereby incorporated by reference.

BACKGROUND OF THE INVENTION

1. Field of the Invention

The present invention relates to a hinge structure, and more particularly to a hinge structure with locking feature applied to an electronic device.

2. Related Art

With the progress of electronic technology, various portable electronic devices such as notebook computers, electronic dictionaries, and clamshell phones have become indispensable in people's work and daily life. Such an electronic product generally includes a display and a main body, and a hinge structure pivoted to the display and the main body serves as a rotating axle center between the display and the main body, such that the display and the main body are connected and rotate relative to each other through the hinge structure.

The portable electronic device is convenient to carry along, and can be taken out and used at any time any place. Meanwhile, due to the above characteristics, the portable electronic device may be easily stolen when the user pays less attention.

Currently, in order to prevent the portable electronic device from being stolen, a lock hole is opened in the case of the portable electronic device for securing an anti-theft lock. Taking a Kensington lock (K-lock) for example, the anti-theft lock includes a lock and a cable connected to an outer edge of the lock. The other end of the cable is secured to a fixed object (for example, a table leg or pillar) around the position where the computer is placed. When the T-shaped lock pin of the lock is inserted into the lock hole, a key may be inserted into the key hole of the lock to drive the T-shaped lock pin to rotate. In this manner, the T-shaped lock pin is retained within an inner end of the lock hole, and thus the anti-theft lock is connected to the portable computer as one piece. Therefore, the computer is confined to a certain position for fear of being stolen.

However, in most portable computers, the lock hole is usually opened at a position around the case where connection ports, such as audio cables and USB connection ports, of other computer peripherals are also disposed nearby, besides the lock hole. Therefore, when the portable computer is configured with connection ports of the peripherals, the user has to further confirm the position of the lock hole on the case, and avoid transmission lines of the peripherals inserted in the connection ports of the case, and in this way, the lock is secured in the lock hole, which it is quite inconvenient for the user.

Moreover, as for the anti-theft lock currently applied to portable electronic devices, it is impossible to get to know right away whether the anti-theft lock has been secured to the electronic device. Thus, the user has to confirm the locking effect by pulling the anti-theft lock. When the user repeatedly pulls the anti-theft lock, the lock hole configured on the portable electronic device may be deformed and expanded due to the abrasion against the lock or become loose relative to the portable electronic device. As a result, the anti-theft lock may not be able to lock the portable electronic device.

SUMMARY OF THE INVENTION

Accordingly, the present invention is directed to a hinge structure with locking feature, which is suitable for solving the problem in a conventional portable electronic device that the lock hole is mounted at four sides around the main body, such that it is inconvenient for the user to secure the lock unit to the lock hole in real time.

A hinge structure with locking feature is provided in the present invention, which is adapted to connect a first body to a second body of an electronic device, such that the first body is capable of rotating relative to the second body. The hinge structure with locking feature of the present invention includes a pivot portion, a support frame, and a lock receptacle. The pivot portion is disposed on the second body, and has a rotating shaft. The support frame has an upright section and a holding section. The upright section is disposed on the first body, and the holding section is connected to the rotating shaft of the pivot portion, so as to rotate relative to the second body through the rotating shaft. The lock receptacle is disposed on the other side of the holding section opposite to the pivot portion, and has a lock hole engaged with a matching lock unit, wherein the electronic device is secured to a fixed position by engaging the lock receptacle with the lock unit.

The hinge structure with locking feature of the present invention is adapted to connect the first body to the second body of the electronic device, so that the first body is capable of rotating relative to the second body. Meanwhile, a lock receptacle is disposed on the support frame of the hinge structure, such that the electronic device has an anti-theft apparatus. Moreover, as the lock receptacle is located at the axle center position of the hinge, the user only needs to confirm the hinge position of the electronic device, so as to rapidly secure the lock unit to the lock receptacle. Therefore, it is quite convenient in operation.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

In the present invention, an electronic device refers to, for example but not limited to, an electronic device having a display connected to its main body through a hinge structure, such as a notebook computer, a tablet computer, an ultra mobile personal computer (UMPC), or an electronic dictionary (or called translator). The notebook computer is taken as an example for illustrations below, and the accompanying drawings are provided for reference only, instead of limiting the present invention.

Figure 1A:
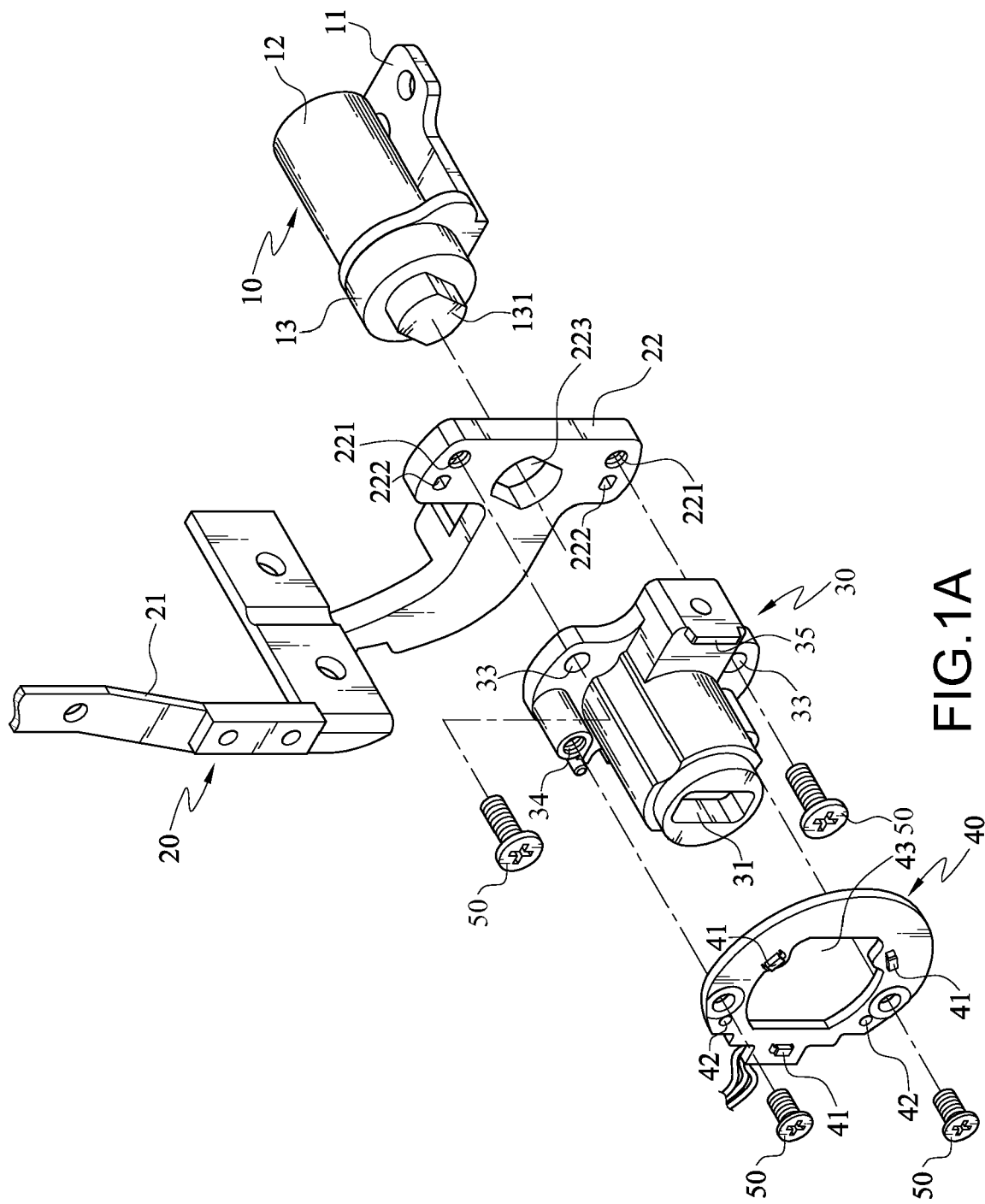
FIG. 1A is a schematic three-dimensional exploded view of an embodiment of the present invention.
Figure 2:
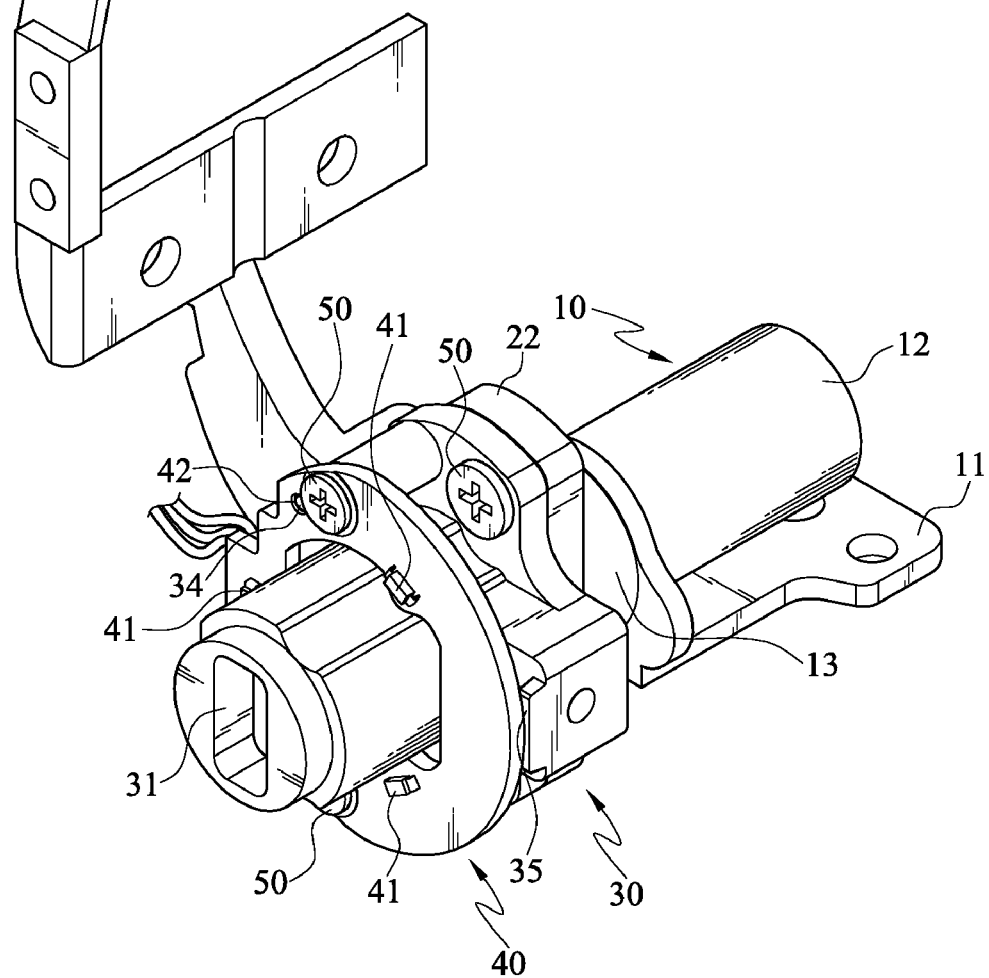
FIG. 2 is a schematic three-dimensional combined view of an embodiment of the present invention.

FIGS. 1A and 2 are schematic three-dimensional views of the present invention. According to the present invention, a hinge structure with locking feature includes a pivot portion 10, a support frame 20, a lock receptacle 30, and a circuit board 40. The pivot portion 10 has a connecting piece 11, a shaft tube 12, and a rotating shaft 13. The connecting piece 11 is connected to the shaft tube 12. One end of the rotating shaft 13 rotationally penetrates through the shaft tube 12, and the other end is provided with a retaining portion 131 protruding out of the shaft tube 12. The support frame 20 has an upright section 21 and a holding section 22. One end of the holding section 22 is connected to the upright section 21, and the other end is provided with two threaded holes 221, two through-holes 222, and an opening 223. The two threaded holes 221 are respectively disposed on two sides of the opening 223, and the two through-holes 222 are also respectively disposed on two sides of the opening 223 and are respectively adjacent to the respective threaded hole 221. The shape of the opening 223 is matched with that of the retaining portion 131 on the rotating shaft 13. Thus, by fitting and clipping the opening 223 on the retaining portion 131, the support frame 20 is able to rotate relative to the pivot portion 10 through the rotating shaft 13.

Figure 1B:
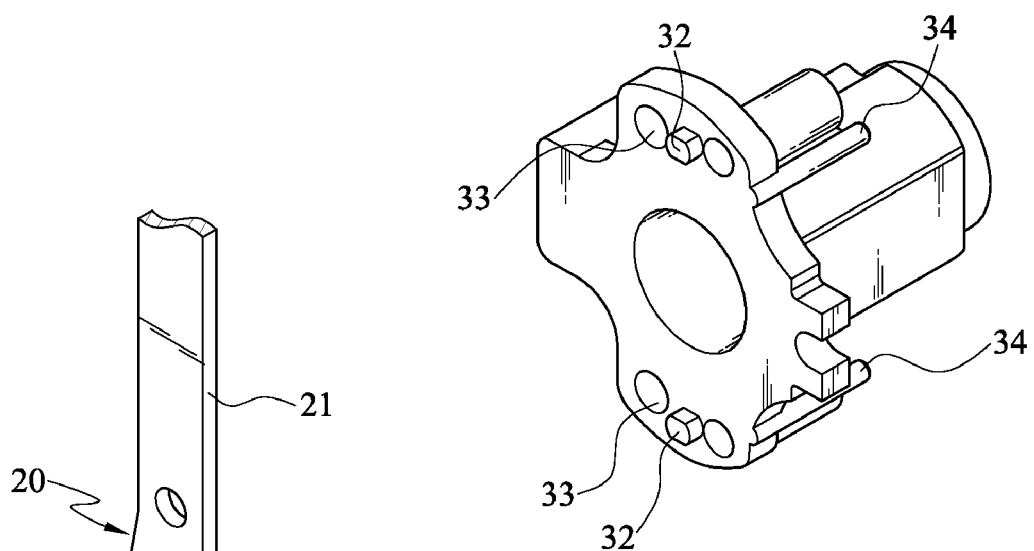
FIG. 1B is a schematic three-dimensional view of a lock hole according to an embodiment of the present invention.

Referring to FIGS. 1A and 2, the lock receptacle 30 is disposed on the other side of the holding section 22 opposite to the rotating shaft 13. The lock receptacle 30 and the rotating shaft 13 are located at the same axle center on the holding section 22. The lock receptacle 30 has a lock hole 31, two insert blocks 32, two locking portions 33, two limiting posts 34, and a stopping portion 35. The lock hole 31 is disposed on the other end of the lock receptacle 30 opposite to the holding section 22, and penetrating through the lock receptacle 30. The insert blocks 32 are disposed on one side of the lock receptacle 30 opposite to the holding section 22 (as shown in FIG. 1B), and they are respectively corresponding to the through-holes 222 of the holding section 22. When the lock receptacle 30 is mounted on the holding section 22, the insert blocks 32 are embedded in the through-holes 222. The two locking portions 33 are respectively disposed on two sides of the lock receptacle 30 corresponding to the threaded holes 221 of the holding section 22. When the lock receptacle 30 is mounted on the holding section 22, fasteners 50 (for example, screws or fixing bolts) respectively penetrate through the locking portions 33 and are retained in the threaded holes 221, so as to fix the lock receptacle 30 to the holding section 22. The limiting posts 34 are disposed below the locking portions 33, and the stopping portion 35 is disposed on the other end of the lock receptacle 30 opposite to the limiting posts 34.

Referring to FIGS. 1A and 2, the circuit board 40 is disposed with a plurality of light-emitting diodes (LEDs) 41, and has two positioning holes 42 and a port 43. The positioning holes 42 are respectively disposed on two sides of the port 43 corresponding to the limiting posts 34 of the lock receptacle 30. When the circuit board 40 is fit on the lock receptacle 30 through the port 43, and secured to the lock receptacle 30 by the fasteners 50, one end of the circuit board 40 rests against the stopping portion 35, and the limiting posts 34 of the lock receptacle 30 respectively penetrate through the positioning holes 42 of the circuit board 40.

Figure 3:
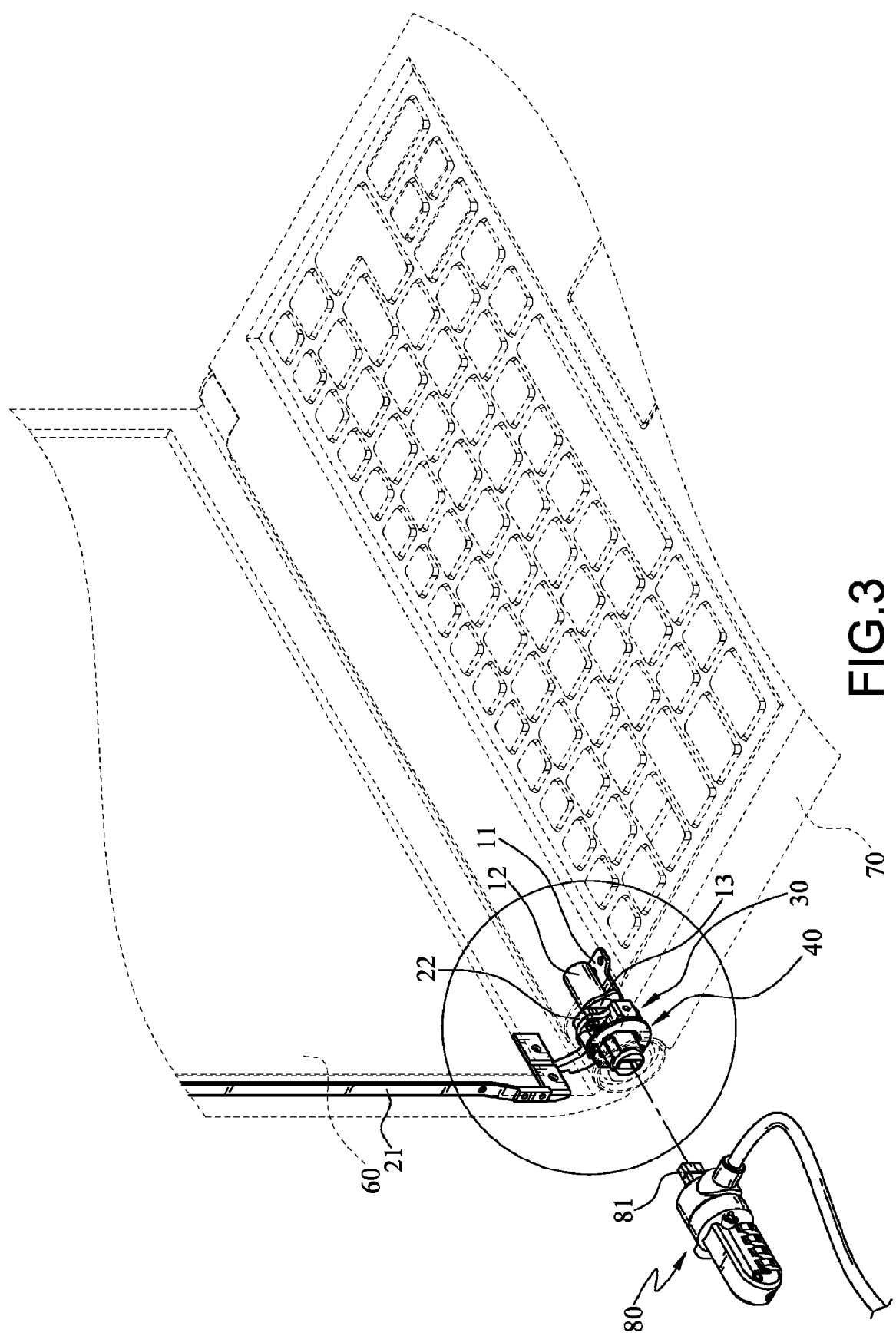
FIG. 3 is a schematic view showing an application of an embodiment of the present invention.
Figure 4:
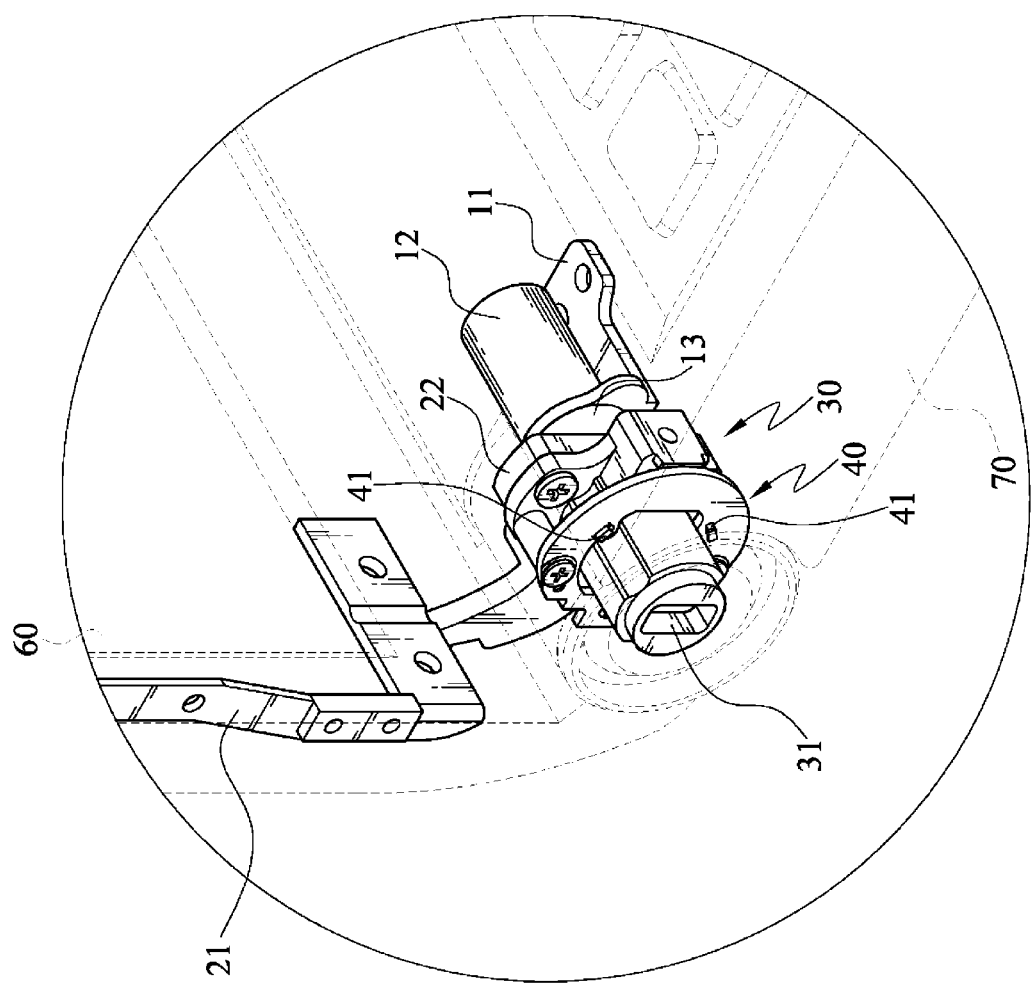
FIG. 4 is a schematic partially enlarged view of an embodiment of the present invention.

Referring to FIGS. 3 and 4, the hinge structure with locking feature of the present invention is applied to a notebook computer. The notebook computer includes a first body 60 (for example, a display) and a second body 70 (for example, a main body). The hinge structure with locking feature of the present invention is disposed between the first body 60 and the second body 70, and is fixed to the second body 70 through the connecting piece 11 of the pivot portion 10. The upright section 21 of the support frame 20 is fixed to the first body 60, so that the first body 60 is connected to the second body 70. The holding section 22 of the support frame 20 is fit and clipped on the rotating shaft 13 of the pivot portion 10, so as to rotate relative to the pivot portion 10 through the rotating shaft 13. Therefore, when the support frame 20 rotates relative to the pivot portion 10 through the rotating shaft 13, the support frame 20 drives the first body 60 together to rotate relative to the second body 70.

Meanwhile, the lock receptacle 30 disposed on the holding section 22 is combined with a matching lock unit 80. In this embodiment, the lock unit 80 is of a Kensington lock (K-lock) type, and has a lock pin 81 matching with the shape of the lock hole 31 in the lock receptacle 30. Therefore, the lock pin 81 penetrates through the lock hole 31 and is retained in the lock hole 31, such that the lock unit 80 is locked to the lock hole 31, and the notebook computer is thus secured to the position where it is placed by engaging the the lock receptacle 30 with the lock unit 80. As the lock receptacle 30 and the rotating shaft 13 are located at the same axle center on the holding section 22, the lock hole 31 is also located at the axle center of the hinge structure. When the lock unit 80 is used to lock the notebook computer, as long as the hinge position of the notebook computer is confirmed, the lock pin 81 can be immediately inserted and retained in the lock hole 31 smoothly, without wasting time in searching for the lock receptacle 30 on the second body 70.

Furthermore, when being disposed on the lock receptacle 30, the circuit board 40 is electrically connected to a power module (not shown) in the notebook computer, such that the LEDs 41 on the circuit board 40 can be turned on upon being powered by a battery of the notebook computer or turned on after electrically connecting the notebook computer to a power line. Once being turned on, the LEDs 41 may emit light continuously or intermittently (for example, flashing once every five seconds), for indicating the position of the lock hole 31 on the notebook computer. Alternatively, when the lock unit 80 is locked to the lock hole 31, the LEDs 41 on the circuit board 40 are turned on through electric touch or mechanical actuation, such that the user can immediately figure out whether the lock unit 80 is engaged in the lock hole 31 or not. The light-emitting modes and electric touch or mechanical actuation of the LEDs 41 are merely given as an example, and the detailed structures and actuation modes are not technical features of the present invention, which thus will not be described herein again.

Therefore, by disposing the LEDs on the circuit board, the position of the lock hole is shown in the notebook computer, such that the hinge structure with locking feature of the present invention can not only lock the notebook computer, but also indicate the position of the lock receptacle and show the locking status.

The hinge structure with locking feature of the present invention is used to connect a first body to a second body of an electronic device, so that the first body is capable of rotating relative to the second body. The lock receptacle disposed on the hinge structure is combined with the matching lock unit, such that the electronic device is secured to a fixed position.

In view of the above, the hinge structure with locking feature of the present invention not only serves as a hinge to enable the first body of the electronic device to rotate relative to the second body, but also is provided with a lock receptacle to prevent the electronic device from being stolen. Besides, since such an anti-theft apparatus is disposed on the hinge structure, the user only needs to confirm the hinge position of the electronic device, so as to successfully secure the lock unit to the lock receptacle, which thus is more convenient to operate. Moreover, the LEDs of the circuit board fit on the lock receptacle can be turned on to indicate the position of the lock receptacle and show the locking status.

What is claimed is:

1. A hinge structure with locking feature, adapted to connect a first body to a second body of an electronic device, such that the first body is capable of rotating relative to the second body, and the hinge structure comprising:
a pivot portion, disposed on the second body having a rotating shaft;
a support frame, having an upright section and a holding section, the holding section having at least one through-hole, wherein the upright section is disposed on the first body, and the holding section is connected to the rotating shaft, so as to rotate relative to the second body through the rotating shaft; and
a lock receptacle, disposed on the other side of the holding section opposite to the rotating shaft and having
a lock hole engaged with a matching lock unit; and
at least one insert block being embedded in the through-hole when the lock receptacle is disposed at the holding section,
wherein the electronic device is secured to a fixed position by engaging the lock receptacle with the matching lock unit,
wherein the lock receptacle rotates relative to the second body when the lock receptacle is fixed to the holding section by fasteners, which is combined with the matching lock unit.

2. The hinge structure with locking feature according to claim 1, wherein the lock receptacle and the rotating shaft are located at the same axle center on the support frame.

3. The hinge structure with locking feature according to claim 1, wherein the rotating shaft has a retaining portion, the holding section has an opening matching with the retaining portion, and the retaining portion is clipped in the opening, such that the rotating shaft drives the support frame to rotate relative to the second body.

4. The hinge structure with locking feature according to claim 1, wherein the pivot portion further has a connecting piece, and the pivot portion is fixed to the second body through the connecting piece.

5. The hinge structure with locking feature according to claim 1, further comprising a circuit board, wherein the circuit board is disposed on the lock receptacle and has at least one light-emitting diode (LED).

6. The hinge structure with locking feature according to claim 5, wherein the lock receptacle further has a stopping portion, and the circuit board is disposed on the lock receptacle and rests against the stopping portion.

7. The hinge structure with locking feature according to claim 5, wherein the lock receptacle has at least one limiting post, the circuit board has at least one positioning hole, and the limiting post penetrates through the positioning hole when the circuit board is fixed to the lock receptacle.

8. The hinge structure with locking feature according to claim 1, wherein the fastener is a screw or a fixing bolt.

9. A hinge structure with locking feature, adapted to connect a first body to a second body of an electronic device, such that the first body is capable of rotating relative to the second body, and the hinge structure comprising:
a pivot portion, disposed on the second body having a rotating shaft;
a support frame, having an upright section and a holding section, the holding section having at least one through-hole, wherein the upright section is disposed on the first body, and the holding section is connected to the rotating shaft, so as to rotate relative to the second body through the rotating shaft; and
a lock receptacle, disposed on the other side of the holding section opposite to the rotating shaft and having
a rectangular shaped lock hole engaged with a matching lock unit; and
at least one insert block being embedded in the through-hole when the lock receptacle is disposed at the holding section,
wherein the electronic device is secured to a fixed position by engaging the lock receptacle with the matching lock unit,
wherein the lock receptacle rotate relative to the second body when the lock receptacle is fixed to the holding section by fasteners, which is combined with the matching lock unit.

10. The hinge structure with locking feature according to claim 9, wherein the lock receptacle and the rotating shaft are located at the same axle center on the support frame.

11. The hinge structure with locking feature according to claim 9, wherein the rotating shaft has a retaining portion, the holding section has an opening matching with the retaining portion, and the retaining portion is clipped in the opening, such that the rotating shaft drives the support frame to rotate relative to the second body.

12. The hinge structure with locking feature according to claim 9, wherein the pivot portion further has a connecting piece, and the pivot portion is fixed to the second body through the connecting piece.

13. The hinge structure with locking feature according to claim 9, further comprising a circuit board, wherein the circuit board is disposed on the lock receptacle and has at least one light-emitting diode (LED).

14. The hinge structure with locking feature according to claim 9, wherein the fastener is a screw or a fixing bolt.

15. The hinge structure with locking feature according to claim 13, wherein the lock receptacle further has a stopping portion, and the circuit board is disposed on the lock receptacle and rests against the stopping portion.

16. The hinge structure with locking feature according to claim 13, wherein the lock receptacle has at least one limiting post, the circuit board has at least one positioning hole, and the limiting post penetrates through the positioning hole when the circuit board is fixed to the lock receptacle.

* * * * *